United States Patent
Omura

(10) Patent No.: US 12,373,380 B2
(45) Date of Patent: Jul. 29, 2025

(54) STORAGE DEVICE, INFORMATION PROCESSING SYSTEM, AND CONTROL METHOD

(71) Applicant: BUFFALO INC., Nagoya (JP)

(72) Inventor: Toshio Omura, Aichi (JP)

(73) Assignee: BUFFALO INC., Nagoya (JP)

( * ) Notice: Subject to any disclaimer, the term of this patent is extended or adjusted under 35 U.S.C. 154(b) by 17 days.

(21) Appl. No.: 18/376,082

(22) Filed: Oct. 3, 2023

(65) Prior Publication Data
US 2024/0119021 A1    Apr. 11, 2024

(30) Foreign Application Priority Data
Oct. 5, 2022    (JP) .................. 2022-161074

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ...................................................... G06N 20/00
See application file for complete search history.

(56) References Cited

U.S. PATENT DOCUMENTS

| | | | | |
|---|---|---|---|---|
| 7,747,796 B1 * | 6/2010 | Kumar | .................. | G06F 13/385 710/316 |
| 11,252,609 B2 * | 2/2022 | Igawa | .................. | H04W 28/10 |
| 2003/0110332 A1 * | 6/2003 | Suzuki | ............. | H04N 21/42646 710/36 |
| 2013/0013842 A1 | 1/2013 | Numamoto et al. | | |
| 2015/0261712 A1 | 9/2015 | Numamoto et al. | | |
| 2020/0286547 A1 | 9/2020 | Maruyama et al. | | |

FOREIGN PATENT DOCUMENTS

| | | |
|---|---|---|
| JP | 2005-208811 A | 8/2005 |
| JP | 2013-016096 A | 1/2013 |
| JP | 2013-201475 A | 10/2013 |
| JP | 2020-144589 A | 9/2020 |

OTHER PUBLICATIONS

Notification of Reasons for Refusal mailed on Feb. 28, 2022, received for JP Application 2022-161074, 12 pages including English Translation.

* cited by examiner

*Primary Examiner* — Henry Tsai
*Assistant Examiner* — Juanito C Borromeo
(74) *Attorney, Agent, or Firm* — XSENSUS LLP

(57) ABSTRACT

A storage device connected to an information processing apparatus includes processing circuitry configured to perform data transfer with the information processing apparatus at any one of a plurality of predetermined data transfer rates. The processing circuitry is further configured to perform the data transfer with the information processing apparatus at a data transfer rate lower than a data transfer rate of an upper limit among the plurality of data transfer rates, without performing the data transfer at the data transfer rate of the upper limit.

9 Claims, 3 Drawing Sheets

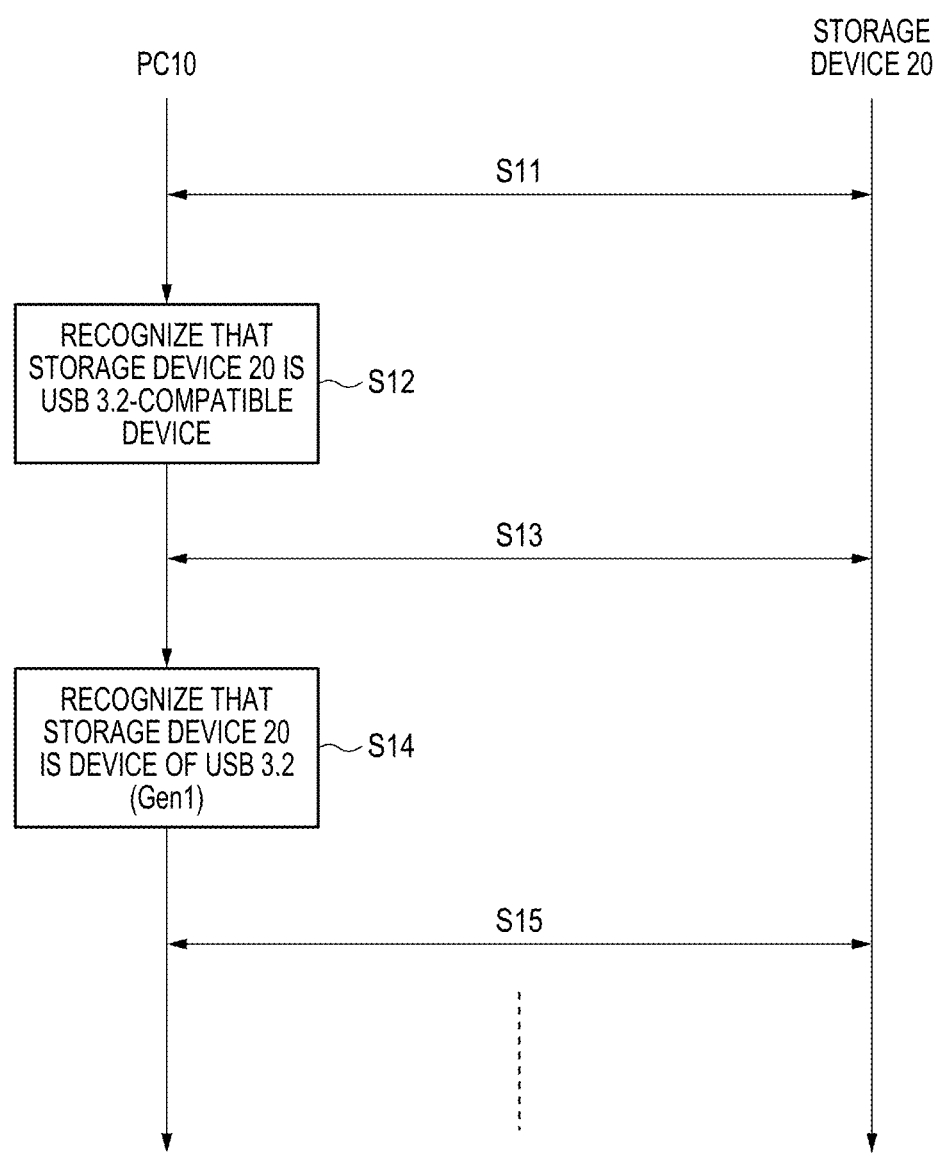

STORAGE DEVICE, INFORMATION PROCESSING SYSTEM, AND CONTROL METHOD

CROSS-REFERENCE TO RELATED APPLICATION

This application is based on and claims priority under 35 USC § 119 from Japanese Patent Application No. 2022-161074, filed on Oct. 5, 2022, the entire contents of which are incorporated herein by reference.

TECHNICAL FIELD

The present disclosure relates to a storage device, an information processing system, and a control method.

BACKGROUND

In a storage device such as a solid state drive (SSD), a host controller (hereinafter, simply referred to as a controller) that performs data transfer with a personal computer (PC) serving as a host is designed according to a standard such as a universal serial bus (USB). In recent years, a data transfer rate of the controller has been increasing. There are also standards corresponding to a plurality of data transfer rates.

A USB 3 host controller that switches a transfer speed according to the transfer speed of data used on the PC side is disclosed in JP2013-016096A.

SUMMARY

According to an aspect of the present disclosure, there is provided a storage device, the storage device including: processing circuitry configured to perform data transfer with an information processing apparatus at any one of a plurality of predetermined data transfer rates, in which the processing circuitry is configured to perform the data transfer with the information processing apparatus at a data transfer rate lower than a data transfer rate of an upper limit among the plurality of data transfer rates, without performing the data transfer at the data transfer rate of the upper limit.

According to another aspect of the present disclosure, there is provided an information processing system including: an information processing apparatus; and a storage device connected to the information processing apparatus, in which the storage device includes processing circuitry configured to perform data transfer with the information processing apparatus at any one of a plurality of predetermined data transfer rates, and in which the processing circuitry is configured to perform the data transfer with the information processing apparatus at a data transfer rate lower than a data transfer rate of an upper limit among the plurality of data transfer rates, without performing the data transfer at the data transfer rate of the upper limit.

According to another aspect of the present disclosure, there is provided a control method, the control method including: controlling data transfer at any one of a plurality of predetermined data transfer rates between a storage device connected to an information processing apparatus and the information processing apparatus; and performing the data transfer with the information processing apparatus at a data transfer rate lower than a data transfer rate of an upper limit among the plurality of data transfer rates, without performing the data transfer rate of the upper limit.

BRIEF DESCRIPTION OF DRAWINGS

Exemplary embodiments of the present disclosure will be described in detail based on the following figures, wherein:

FIG. 3 is a flowchart illustrating an operation example of the information processing system according to the embodiment of the present disclosure.

DETAILED DESCRIPTION

Figure 1:
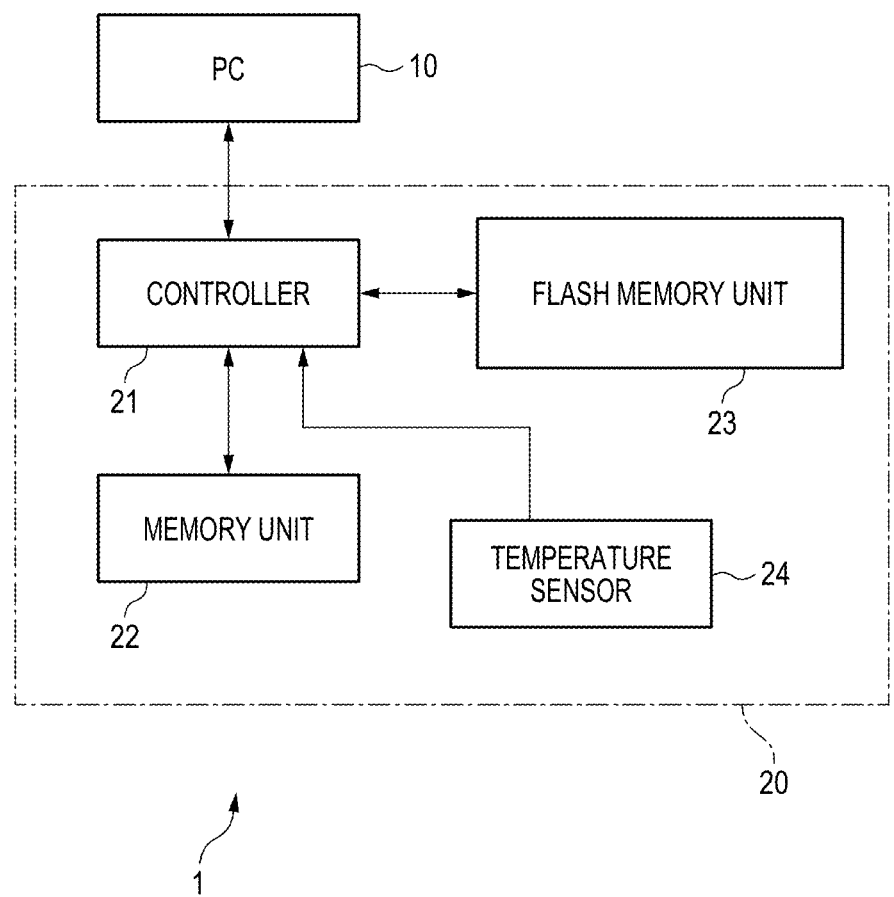
FIG. 1 is a block diagram illustrating a configuration example of an information processing system according to an embodiment of the present disclosure.

The present disclosure will be described with reference to the drawings. As illustrated in FIG. 1, an information processing system 1 according to the embodiment of the present disclosure includes a personal computer (PC) 10, which is an example of an information processing apparatus, and a storage device 20, and the PC 10 and the storage device 20 are connected so as to be able to transfer data according to a predetermined standard such as USB. In the following description, it is assumed that the storage device 20 is an SSD, and the PC 10 and the storage device 20 are connected to each other via the USB.

The PC 10 is a general personal computer, recognizes the connected storage device 20, and determines a data transfer mode based on a result of the recognition. In the data transfer mode determined here, the PC 10 transmits data to the storage device 20 and requests the storage device 20 to store the data. Further, the PC 10 requests the storage device 20 to read the data, and receives the data transmitted by the storage device 20 in response to the request in the determined data transfer mode.

As illustrated in FIG. 1, the storage device 20 includes a controller 21, a memory unit 22, and a flash memory unit 23 which is an example of a memory device. The storage device may include a temperature sensor 24 that measures a temperature inside a housing of the storage device 20. Here, since it is assumed that the storage device 20 is the SSD as described above, the memory device is realized by the flash memory unit 23, but a type of the memory device is different depending on a type of the storage device 20.

In order to reduce a size of the device, for example, there is a storage device using a chip-on-board mounting technique. In particular, in such a small storage device, there has been a demand for suppressing heat generation of circuits and the like used therein since a countermeasure for heat radiation is complicated.

The controller 21 of the storage device 20 is a USB host controller (USB 3.2 (Gen2)-compatible controller) capable of transferring data at any one of a plurality of predetermined data transfer rates, and operates according to a program prepared in advance.

When the controller 21 according to an embodiment is connected to the PC 10, the controller 21 executes initialization processing for initializing the connection with the PC 10. After the initialization of the connection, the controller 21 executes data storage processing for storing and reading data with the flash memory unit 23 and data transfer processing for transferring data with the PC 10.

In an embodiment, the controller 21 is set not to perform the data transfer at at least the data transfer rate of an upper limit among the plurality of data transfer rates during the initialization processing. Hereinafter, the data transfer rate of the upper limit, that is, the maximum data transfer rate of the storage device 20 is referred to as a function upper limit. In other words, the controller 21 is set to perform the data transfer with the PC 10 at a data transfer rate lower than the data transfer rate of the function upper limit (that is, less than the function upper limit). An operation of the controller 21 will be described later.

The memory unit 22 operates as a work memory of the controller 21. The memory unit 22 may include a nonvolatile memory device. The flash memory unit 23 is a NAND flash memory, transmits and receives data to and from the controller 21, and stores data transmitted from the controller 21 in an area specified by an address determined by a predetermined method. The flash memory unit 23 receives a reading instruction to read the stored data, reads the data from the address designated in the reading instruction, and transmits the read data to the controller 21. Since the processing for storing and reading data in and from the flash memory unit 23 can be performed by a widely known method, a detailed description thereof will be omitted here.

Figure 2:
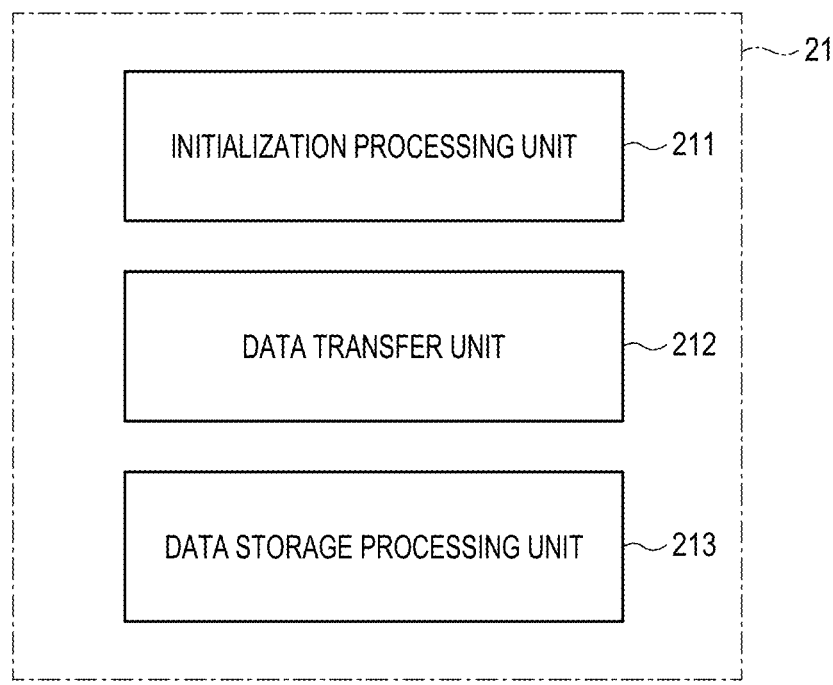
FIG. 2 is a functional block diagram of a controller of a storage device according to an example of the embodiment of the present disclosure.

Next, the operation of the controller 21 will be described. In an embodiment, the controller 21 is a USB 3.2 (Gen2)-compatible controller and is capable of transferring data at any one of the plurality of predetermined data transfer rates. As illustrated in FIG. 2, the controller 21 functionally includes an initialization processing unit 211, a data transfer unit 212, and a data storage processing unit 213.

The functions of the initialization processing unit 211, the data transfer unit 212, and the data storage processing unit 213 may be implemented by circuitry elements, or may be implemented by a general-purpose processor, a dedicated processor, an integrated circuit, an application-specific integrated circuit (ASIC), and processing circuitry including a combination thereof, which are configured or programmed so as to perform the functions disclosed herein. The processor includes a transistor and other circuit elements therein, and can be regarded as processing circuitry. In the present disclosure, the circuitry element and the means are hardware configured to perform the functions described above. The hardware may be any hardware disclosed herein, or may be known hardware configured or programmed to perform the functions described above. When the hardware is a processor that can be regarded as a kind of circuit element, the circuitry element and means are a combination of hardware and software, and the software is used for setting the hardware and the processor.

When the PC 10 and the storage device 20 are connected to each other, the initialization processing unit 211 starts the initialization processing and executes a negotiation process of the connection in the USB 3.2. For example, the initialization processing unit 211 transmits and receives predetermined signals to and from the PC 10, and causes the PC 10 to recognize that the storage device 20 is a USB 3.2-compatible device. Further, the initialization processing unit 211 transmits, to the PC 10, information about which one of the USB 3.2 (Gen1) and the USB 3.2 (Gen2) is to be used for the connection, and the number of lanes. One of the characteristics of this example is that the initialization processing unit 211 transmits, to the PC 10, information indicating that the connection is to be established in the USB 3.2 (Gen1), although the controller 21 itself is compatible with the USB 3.2 (Gen2), and performs the initialization processing to establish the connection with the PC 10 in the USB 3.2 (Gen1).

In the USB 3.2 (Gen2), the function upper limit of the data transfer rate with the PC is 10 Gbps that is relatively high, and in the USB 3.2 (Gen1), the upper limit of the data transfer rate is 5 Gbps that is relatively low. The connection in the USB 3.2 (Gen2) corresponds to an example of a first mode in the present disclosure, and the connection in the USB 3.2 (Gen1) corresponds to an example of a second mode in the present disclosure.

When the initialization processing unit 211 transmits the information indicating that the connection is to be established in the USB 3.2 (Gen1) as described above, it is set such that the controller 21 cannot operate in the first mode, and the controller 21 operates in the second mode.

By this processing of the initialization processing unit 211, the storage device 20 according to this example is recognized as a device of USB 3.2 (Gen1) by the PC 10, and is controlled such that the data transfer with the PC 10 is performed with 5 Gbps as an upper limit, which is a data transfer rate lower than 10 Gbps which is a data transfer rate of the function upper limit for the controller 21. The upper limit thus set by the operation of the controller 21 according to the present embodiment is hereinafter referred to as a set upper limit in order to distinguish from the function upper limit. That is, the controller 21 is set to perform the data transfer with the PC 10 at a data transfer rate lower than the data transfer rate serving as the function upper limit (at a data transfer rate less than the function upper limit) without performing the data transfer at at least a data transfer rate of the function upper limit, among the plurality of data transfer rates.

The data transfer unit 212 transfers data to and from the PC 10 in the connection mode initialized by the initialization processing unit 211. As described above, in this example, since the storage device 20 is recognized as the USB 3.2 (Gen1) device by the PC 10, the data transfer unit 212 receives data to be stored in the flash memory unit 23 from the PC 10 at a data transfer rate of 5 Gbps which is the maximum set upper limit. The data transfer unit 212 transmits the data read from the flash memory unit 23 to the PC 10 at a maximum data transfer rate of 5 Gbps (set upper limit).

The data storage processing unit 213 transmits data to be stored in the flash memory unit 23, which is received from the PC 10 by the operation of the data transfer unit 212, to the flash memory unit 23 at a predetermined data transfer rate (hereinafter, referred to as a reading and writing speed in order to distinguish from the data transfer rate with the PC 10). Upon receiving an instruction to read data from the PC 10, the data storage processing unit 213 requests the flash memory unit 23 to read data stored at an address of the flash memory unit 23 specified in the instruction. The data storage processing unit 213 receives the data read at the reading and writing speed from the flash memory unit 23 responding to the request, and outputs the received data to the data transfer unit 212.

(Operation)

The information processing system 1 according to the present embodiment basically has the above configuration and operates as follows. Hereinafter, it is assumed that the controller 21 of the storage device 20 is a USB 3.2 (Gen2)-compatible controller.

When the storage device 20 is connected to the PC 10, the storage device 20 starts the initialization processing. As illustrated in FIG. 3, the storage device 20 and the PC 10 transmit and receive predetermined signals (S11), and the PC 10 recognizes that the connected storage device 20 is the USB 3.2-compatible device (S12).

The storage device 20 transmits, to the PC 10, information indicating that the connection is to be established in the USB 3.2 (Gen1) although the controller 21 is compatible with the USB 3.2 (Gen2) (S13).

The PC 10 recognizes that the storage device 20 is a USB 3.2 (Gen1) device (S14).

Hereinafter, the PC 10 and the storage device 20 perform the data transfer at the data transfer rate with 5 Gbps as the maximum set upper limit (the function upper limit of the storage device 20 is 10 Gbps) according to the USB 3.2 (Gen1) standard to store data in the storage device 20 and to read data from the storage device 20 (S15).

According to this example of the present embodiment, although the storage device 20 is compatible with USB 3.2 (Gen2), the storage device 20 is connected as the USB 3.2 (Gen1) device without performing the data transfer at the data transfer rate of the function upper limit (10 Gbps). Accordingly, the data transfer is performed at the data transfer rate (5 Gbps) of the set upper limit or less, which is lower than the function upper limit of the storage device 20, and heat generation of the device may be suppressed.

In this example, the data transfer is performed at a relatively low data transfer rate below the function upper limit of the storage device 20 at the maximum from the beginning of the connection of the storage device 20 to the PC 10. Even in a case where a function of lowering the data transfer rate in response to temperature rise of the storage device 20 is provided, an opportunity for the function to operate is reduced, and data transfer is performed at a relatively constant rate.

Another Example 1

The operation of the controller 21 of the storage device 20 according to an embodiment of the present disclosure is not limited to the above-described example. As another example 1 of an embodiment of the present disclosure, an example in which an operation of the initialization processing unit 211 and an operation of the data transfer unit 212 of the controller 21 are different from those described above will be described.

When the PC 10 and the storage device 20 are connected to each other, the initialization processing unit 211 of the controller 21 according to the present example starts the initialization processing and executes the negotiation process of the connection in the USB 3.2.

The initialization processing unit 211 transmits and receives predetermined signals to and from the PC 10, and causes the PC 10 to recognize that the storage device 20 is the USB 3.2-compatible device. Next, the initialization processing unit 211 transmits, to the PC 10, information indicating that the connection is to be established in the USB 3.2 (Gen2), and performs the initialization processing to establish the connection with the PC 10 in the USB 3.2 (Gen2).

By this processing, the storage device 20 according to this example is recognized as a device of USB 3.2 (Gen2) by the PC 10, and is controlled by the controller 21 to be in a state in which the data can be transferred at 10 Gbps which is the data transfer rate of the function upper limit.

The data transfer unit 212 performs the data transfer with the PC 10 in accordance with the connection mode initialized by the initialization processing unit 211, but in this example, the data transfer unit 212 does not perform the data transfer at at least the data transfer rate of the function upper limit among the plurality of data transfer rates predetermined by the USB 3.2 (Gen2), and performs the data transfer with the PC 10 at the data transfer rate lower than the data transfer rate of the function upper limit (that is, the data transfer rate less than the function upper limit).

Specifically, it is assumed that the data transfer unit 212 of this example performs the data transfer with the PC 10 at a data transfer rate with the predetermined set upper limit as an upper limit among data transfer rates allowed in the USB 3.2 (Gen2). Here, the set upper limit is at least a data transfer rate (corresponding to an example of a second data transfer rate according to the present disclosure) which is lower than the data transfer rate (corresponding to an example of a first data transfer rate according to the present disclosure) of the function upper limit (that is, the data transfer rate less than the function upper limit).

Accordingly, the data transfer unit 212 performs the data transfer at at most the second data transfer rate that is the maximum set upper limit, without performing the data transfer with the PC 10 at the first data transfer rate of the function upper limit. That is, the data transfer unit 212 of this example receives data stored in the flash memory unit 23 from the PC 10 at the data transfer rate of, for example, 5 Gbps or less. The data transfer unit 212 transmits the data read from the flash memory unit 23 to the PC 10 at the data transfer rate of, for example, 5 Gbps or less.

According to this example, since the data transfer is performed at the relatively low data transfer rate below the function upper limit of the storage device 20, the heat generation of the device may be suppressed.

Another Example 2

As another example 2 of an embodiment of the present disclosure, an example in which the data storage processing unit 213 intentionally decreases the reading and writing speed with respect to the flash memory unit 23 will be described below. The data storage processing unit 213 intentionally decreases the reading and writing speed with respect to the flash memory unit 23, thereby indirectly setting the data transfer rate between the PC 10 and the storage device 20 to a data transfer rate lower than the data transfer rate of the function upper limit of the storage device 20.

In this example, in the initialization processing, the controller 21 is set to establish the connection with the PC 10 using either USB 3.2 (Gen1) or USB 3.2 (Gen2). The data storage processing unit 213 of the controller 21 sets the reading and writing speed to a reading and writing speed at least lower than an upper limit of the reading and writing speed at least.

The controller 21 transfers data to be stored in the flash memory unit 23 and data read from the flash memory unit 23 to the PC 10. At this time, since the reading and writing speed is limited as described above, a delay occurs in the data transfer with the flash memory unit 23, and as a result, the data transfer rate between the PC 10 and the storage device 20 becomes lower than the function upper limit (for example, 10 Gbps of USB 3.2 (Gen2)) of the storage device 20. In this example, the reading and writing speed to the flash memory unit 23 by the controller 21 is experimentally determined so that the data transfer rate between the PC and the storage device 20 becomes a desired transfer rate less than the function upper limit. Accordingly, the heat generation of the device may be suppressed.

(Control During Operation)

The controller 21 according to an embodiment may control the data transfer rate with the PC 10 when an output of the temperature sensor 24 satisfies a predetermined condition.

For example, when the output of the temperature sensor 24 exceeds a predetermined temperature threshold value, the controller 21 changes the data transfer rate with the PC 10 from the data transfer rate of the set upper limit to a lower data transfer rate (less than the set upper limit). For example, when the data transfer rate of the set upper limit is 5 Gbps, the data transfer rate is lowered to the lower data transfer rate (for example, 2 Gbps).

In this example, when the output of the temperature sensor 24 falls below a predetermined temperature threshold value, the controller 21 sets the data transfer rate with the PC 10 to the data transfer rate of the set upper limit. When the set upper limit is set, for example, to an upper limit rate of USB 3.2 (Gen1) which is lower than the data transfer rate (10 Gbps) that is the function upper limit of the storage device 20, the controller 21 performs the data transfer with the PC 10 at the data transfer rate equal to or lower than the set upper limit.

(Record and Reference of History)

In an example of an embodiment of the present disclosure, information indicating the data transfer rate of the set upper limit may be stored in the nonvolatile memory device of the memory unit 22. In this example, the controller 21 of the storage device 20 reads the information when the storage device 20 is powered on. If the set upper limit indicated by the information is less than the function upper limit and is, for example, 5 Gbps which is the upper limit value of USB 3.2 (Gen1), the controller 21 transmits, to the PC 10, information indicating that the connection is to be established in USB 3.2 (Gen1) during the initialization processing, and controls the PC 10 to recognize the storage device 20 as the device of USB 3.2 (Gen1).

In another example, when the set upper limit indicated by the read information is less than the function upper limit, the controller 21 may transmit, to the PC 10, information indicating that the connection is to be established in USB 3.2 (Gen2) during the initialization processing, and may perform the data transfer with the PC 10 only at the data transfer rate less than or equal to the set upper limit indicated by the read information during the subsequent data transfer.

In another example, when the set upper limit indicated by the read information is less than the function upper limit, the controller 21 may set the reading and writing speed with the flash memory unit 23, as the memory device, to a value less than the upper limit thereof, and control the data transfer rate with the PC 10 to be less than or equal to the set upper limit indicated by the read information.

When the temperature in the housing of the storage device 20 exceeds the temperature threshold value, the controller 21 may perform the above-described operation of changing the data transfer rate with the PC 10 from the data transfer rate of the set upper limit to a lower data transfer rate (less than the set upper limit), and may store a record (rate change record) indicating that the data transfer rate has been changed in the nonvolatile memory device of the memory unit 22 or the PC 10 side.

The controller 21 refers to the rate change record for a predetermined period at the time of power-on of the storage device 20 or at the time of initialization processing. The predetermined period may be, for example, a period from a previous power-on to a previous power-off, or a predetermined time period such as the last five days. When the number of times of the rate change records (the number of times within the period, that is, a frequency) that is referred to exceeds a predetermined threshold value, the controller 21 sets a data transfer rate lower than a value of the current set upper limit as a new set upper limit, and overwrites and stores information indicating the new set upper limit in the nonvolatile memory device of the memory unit 22.

As described above, the following matters are disclosed in this specification.

(1) A storage device, the storage device including:
processing circuitry configured to perform data transfer with an information processing apparatus at any one of a plurality of predetermined data transfer rates,
in which the processing circuitry is configured to perform the data transfer with the information processing apparatus at a data transfer rate lower than a data transfer rate of an upper limit among the plurality of data transfer rates, without performing the data transfer at the data transfer rate of the upper limit.

According to this storage device, it is possible to suppress the heat generation of the storage device, since the storage device is set not to perform the data transfer at a relatively high data transfer rate at which a relatively large amount of heat is generated.

(2) The storage device according to (1),
in which the processing circuitry operates in one of a first mode and a second mode, the second mode being a mode in which an upper limit of a data transfer rate with the information processing apparatus is lower than an upper limit of a data transfer rate in the first mode, and
in which the processing circuitry is configured to disable operation in the first mode and to operate in the second mode.

According to this example, it is possible to suppress the heat generation of the storage device, since the storage device is set not to perform the data transfer at the relatively high data transfer rate at which the relatively large amount of heat is generated.

(3) The storage device according to (1),
in which the processing circuitry operates in one of a first mode in which an upper limit of the data transfer rate with the information processing apparatus is a first data transfer rate and a second mode in which the upper limit of the data transfer rate with the information processing apparatus is lower than the first data transfer rate,
in which in the first mode, at least a second data transfer rate lower than the first data transfer rate is selectable with the first data transfer rate as the upper limit, and
in which in the first mode, the processing circuitry is configured to perform the data transfer with the information processing apparatus at the second data transfer rate without performing the data transfer at the first data transfer rate.

According to this example, even in the first mode in which the relatively high data transfer rate at which the relatively large amount of heat is generated is available, it is possible to suppress the heat generation of the storage device, since the storage device is set not to perform the data transfer at the relatively high data transfer rate.

(4) The storage device according to (1), further including:
a memory configured to store and read data in response to an instruction from the processing circuitry,
in which the processing circuitry is configured to perform the data transfer with the information processing apparatus at the data transfer rate lower than the data transfer rate of the upper limit without performing the data transfer at the data transfer rate of the upper limit, among the plurality of data transfer rates available with the information processing apparatus, by limiting a data storing and reading speed between the processing circuitry and the memory.

According to this example, it is possible to suppress the heat generation of the storage device, since the storage device is controlled not to perform the data transfer at the relatively high data transfer rate at which the relatively large amount of heat is generated.

(5) The storage device according to (2), further including:
a temperature sensor configured to measure a temperature in a housing incorporating the processing circuitry,
in which the processing circuitry controls the data transfer rate with the information processing apparatus in response to a measured temperature satisfying a predetermined condition.

According to this example, it is possible to control the data transfer rate in accordance with the heat generation amount.

(6) The storage device according to (1), in which the storage device is a solid-state drive.

(7) An information processing system including:
an information processing apparatus; and
a storage device connected to the information processing apparatus,
in which the storage device includes processing circuitry configured to perform data transfer with the information processing apparatus at any one of a plurality of predetermined data transfer rates, and
in which the processing circuitry is configured to perform the data transfer with the information processing apparatus at a data transfer rate lower than a data transfer rate of an upper limit among the plurality of data transfer rates, without performing the data transfer at the data transfer rate of the upper limit.

According to this example, it is possible to suppress the heat generation of the storage device, since the storage device is set not to perform the data transfer at the relatively high data transfer rate at which the relatively large amount of heat is generated.

(8) The information processing system according to (7), in which the storage device is a solid-state drive.

(9) A control method, the control method including:
controlling data transfer at any one of a plurality of predetermined data transfer rates between a storage device connected to an information processing apparatus and the information processing apparatus; and
performing the data transfer with the information processing apparatus at a data transfer rate lower than a data transfer rate of an upper limit among the plurality of data transfer rates, without performing the data transfer rate of the upper limit.

According to this example, it is possible to suppress the heat generation of the storage device, since the storage device is set not to perform the data transfer at the relatively high data transfer rate at which the relatively large amount of heat is generated.

(10) A non-transitory computer readable storage medium storing a program for causing a computer to execute the control method according to (9).

According to this example, it is possible to suppress the heat generation of the storage device, since the storage device is set not to perform the data transfer at the relatively high data transfer rate at which the relatively large amount of heat is generated.

What is claimed is:

1. A storage device, the storage device comprising:
processing circuitry configured to
perform data transfer with an information processing apparatus at any one of a plurality of predetermined data transfer rates,
perform the data transfer with the information processing apparatus at a data transfer rate lower than a data transfer rate of an upper limit among the plurality of data transfer rates, without performing the data transfer at the data transfer rate of the upper limit,
operate in one of a first mode in which an upper limit of the data transfer rate with the information processing apparatus is a first data transfer rate and a second mode in which the upper limit of the data transfer rate with the information processing apparatus is lower than the first data transfer rate,
wherein in the first mode, at least a second data transfer rate lower than the first data transfer rate is selectable with the first data transfer rate as the upper limit, and
in the first mode, perform the data transfer with the information processing apparatus at the second data transfer rate without performing the data transfer at the first data transfer rate.

2. The storage device according to claim 1,
wherein the second mode is a mode in which an upper limit of a data transfer rate with the information processing apparatus is lower than an upper limit of a data transfer rate in the first mode, and
wherein the processing circuitry is configured to disable operation in the first mode and to operate in the second mode.

3. The storage device according to claim 1, further comprising:
a memory configured to store and read data in response to an instruction from the processing circuitry,
wherein the processing circuitry is configured to perform the data transfer with the information processing apparatus at the data transfer rate lower than the data transfer rate of the upper limit without performing the data transfer at the data transfer rate of the upper limit, among the plurality of data transfer rates available with the information processing apparatus, by limiting a data storing and reading speed between the processing circuitry and the memory.

4. The storage device according to claim 2, further comprising:
a temperature sensor configured to measure a temperature in a housing incorporating the processing circuitry,
wherein the processing circuitry controls the data transfer rate with the information processing apparatus in response to a measured temperature satisfying a predetermined condition.

5. The storage device according to claim 1,
wherein the storage device is a solid-state drive.

6. An information processing system comprising:
an information processing apparatus; and
a storage device connected to the information processing apparatus,
wherein the storage device includes processing circuitry configured to
perform data transfer with the information processing apparatus at any one of a plurality of predetermined data transfer rates, and
perform the data transfer with the information processing apparatus at a data transfer rate lower than a data transfer rate of an upper limit among the plurality of data transfer rates, without performing the data transfer at the data transfer rate of the upper limit,
operate in one of a first mode in which an upper limit of the data transfer rate with the information processing apparatus is a first data transfer rate and a second mode in which the upper limit of the data transfer rate with the information processing apparatus is lower than the first data transfer rate, wherein in the first mode, at least a second data transfer rate lower than the first data transfer rate is selectable with the first data transfer rate as the upper limit, and in the first mode, perform the data transfer with the information processing apparatus at the second data transfer rate without performing the data transfer at the first data transfer rate.

7. The information processing system according to claim 6,
wherein the storage device is a solid-state drive.

8. A control method, the control method comprising:
controlling data transfer at any one of a plurality of predetermined data transfer rates between a storage device connected to an information processing apparatus and the information processing apparatus;
performing the data transfer with the information processing apparatus at a data transfer rate lower than a data transfer rate of an upper limit among the plurality of data transfer rates, without performing the data transfer rate of the upper limit;

operating in one of a first mode in which an upper limit of the data transfer rate with the information processing apparatus is a first data transfer rate and a second mode in which the upper limit of the data transfer rate with the information processing apparatus is lower than the first data transfer rate, wherein in the first mode, at least a second data transfer rate lower than the first data transfer rate is selectable with the first data transfer rate as the upper limit; and in the first mode, performing the data transfer with the information processing apparatus at the second data transfer rate without performing the data transfer at the first data transfer rate.

9. A non-transitory computer readable storage medium storing a program for causing a computer to execute the control method according to claim 8.

* * * * *